United States Patent [19]

Allen

[11] 4,162,838

[45] Jul. 31, 1979

[54] CAMERA VIEWFINDER

[76] Inventor: Norman C. Allen, P.O. Box 58565, Houston, Tex. 77508

[21] Appl. No.: 865,955

[22] Filed: Dec. 30, 1977

[51] Int. Cl.$^2$ .................................................. G03B 13/02
[52] U.S. Cl. ........................................................ 354/223
[58] Field of Search ..................... 354/151, 223; 355/66

[56] References Cited

U.S. PATENT DOCUMENTS

| 1,998,568 | 4/1935 | Barenyi | 354/151 |
| 2,674,932 | 4/1954 | Tydings et al. | 354/151 |
| 2,963,950 | 12/1960 | Faasch et al. | 354/151 |
| 3,498,713 | 3/1970 | Schlegel et al. | 355/66 |
| 3,815,149 | 6/1974 | Ishihara | 354/223 |

FOREIGN PATENT DOCUMENTS 1438788  6/1976  United Kingdom ..................... 354/223

Primary Examiner—Donald A. Griffin

[57] ABSTRACT

Photographers frequently want to obtain pictures of unposed subjects or pictures taken from an unusual angle. The concept presented in this application is an optical design which facilitates such photography. The device utilizes an image correcting prism structure mounted and articulated in such fashion that the photographer can function in a casual manner.

4 Claims, 1 Drawing Figure

CAMERA VIEWFINDER

BACKGROUND OF THE INVENTION

For many years early camera designs utilized viewfinders which had to be held at waist level to view an inadequate, right-to-left reversed, image which was extremely difficult and awkward. Subsequent viewfinder/optical system design improved the image quality and the ability of the photographer to compose the scene or subject but have continued to require very deliberate and confining action on the part of the photographer. The constraint often imposed by the viewfinder system designed into the camera affects the response and naturalness of subjects and limits the point-of-view from which pictures can be taken.

SUMMARY OF THE INVENTION

This invention describes an improved method to achieve freedom from these constraints and substantially improve camera handling in dynamic situations.

DETAILED DESCRIPTION OF THE INVENTION

Figure 1:
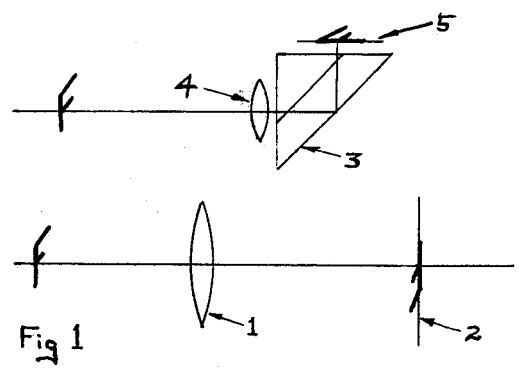
FIG. 1 shows a schmatic view of the light imaging portions of a camera and associated viewfinder.

This improved viewfinder design utilizes a focussion lens, an Amici roof prism, and diffuse viewing screen which, in correct combination, presents a view of the picture available to the photographer. This optical assembly is mounted on the camera (or any other instrument to be pointed in a given way) so that it can be mechanically rotated about an axis which is parallel to both the axis of the camera and the axis of the focussing viewfinder lens element. FIG. 1 shows the camera film (2) -lens (1) combination and the subject viewfinder consisting of an Amici roof prism assembly (3), focussing lens (4), and viewing screen (5). The viewing screen can consist of a simple light diffuser or a more sophisticated device such as a channel intensifier detector.

I claim that:

1. An accessory for use with a camera to aid in viewing the image being transmitted by the lens through the shutter to the film thereof, said accessory comprising an imaging lens, an Amici roof prism, and a diffuse viewing screen suitably positioned relative to each other so as to allow viewing of the image obtained by said accessory lens on said screen in a normal, facile manner, said accessory having means for mounting same on a camera in a suitable position thereon relative to the camera lens, said viewing screen being adapted to be rotated about an axis parallel to the axis of the camera lens and perpendicular to the axis of the film to enable the said accessory to be optionally used as a waist level viewer and a right angle viewer.

2. The accessory as set forth in claim 1 wherein said viewing screen is a channel intensifier detector.

3. The accessory as set forth in claim 1 wherein said roof prism is constructed of plane or focussing surfaces or a solid structure of optical material which may have reflective materials applied to the surfaces.

4. The accessory, as set forth in claim 1, may be incorporated into handles, fixtures and remote control apparatus, which may be useful to the photographer.

* * * * *